United States Patent
Asakawa

(10) Patent No.: US 9,541,810 B2
(45) Date of Patent: Jan. 10, 2017

(54) LIQUID CRYSTAL DISPLAY DEVICE

(71) Applicant: Japan Display Inc., Minato-ku (JP)

(72) Inventor: Youichi Asakawa, Nonoichi (JP)

(73) Assignee: Japan Display Inc., Minato-ku (JP)

(*) Notice: Subject to any disclaimer, the term of this patent is extended or adjusted under 35 U.S.C. 154(b) by 102 days.

(21) Appl. No.: 13/922,413

(22) Filed: Jun. 20, 2013

(65) Prior Publication Data

US 2013/0342776 A1    Dec. 26, 2013

(30) Foreign Application Priority Data

Jun. 25, 2012   (JP) ................. 2012-142211

(51) Int. Cl.
  *G02F 1/1343*  (2006.01)
  *G02F 1/1362*  (2006.01)
  *G02F 1/133*   (2006.01)
  *G02F 1/1337*  (2006.01)

(52) U.S. Cl.
  CPC ..... *G02F 1/136286* (2013.01); *G02F 1/13306* (2013.01); *G02F 1/133707* (2013.01); *G02F 1/134363* (2013.01)

(58) Field of Classification Search
  CPC ............ G02F 1/134363; G02F 1/133707; G02F 2001/134372; G02F 1/136286; G02F 1/13306
  USPC ................................ 349/141, 139
  See application file for complete search history.

(56) References Cited

U.S. PATENT DOCUMENTS

| 2010/0097535 A1* | 4/2010 | Inoue ................ G02F 1/133707 349/38 |
| 2010/0253897 A1* | 10/2010 | Ohgami ............ G02F 1/134309 349/142 |
| 2012/0019753 A1* | 1/2012 | Mitsumoto ......... G02F 1/13363 349/118 |
| 2012/0019759 A1* | 1/2012 | Sunohara et al. ............ 349/138 |
| 2013/0093739 A1* | 4/2013 | Kim ..................... G09G 3/3648 345/206 |

(Continued)

FOREIGN PATENT DOCUMENTS

| JP | 2000-356786 | 12/2000 |
| JP | 2009-042634 | 2/2009 |
| JP | 2010-8597 | 1/2010 |

OTHER PUBLICATIONS

Lisen Chuang Wei-Fen Bair, An Overview of Wide-Viewing Angle LCD Uising Inter-Digital Electrodes, Jul. 26, 2000, Display Technologies III, vol. 4079, 177.*

(Continued)

*Primary Examiner* — Nathanael R Briggs
*Assistant Examiner* — William Peterson
(74) *Attorney, Agent, or Firm* — Oblon, McClelland, Maier & Neustadt, L.L.P.

(57) ABSTRACT

According to one embodiment, a liquid crystal display device includes a first substrate including a common electrode, a pixel electrode which includes an electrode portion which forms a slit opposed to the common electrode, a second substrate, and a liquid crystal layer formed of a liquid crystal material having a negative dielectric constant anisotropy. The slit and the electrode portion are arranged in the first direction and extend in the second direction. L/S is in a range of between 0.5 and 0.9 when a width of the slit in the first direction is S and a width of the electrode portion in the first direction is L.

12 Claims, 9 Drawing Sheets

(56) References Cited

U.S. PATENT DOCUMENTS

2013/0100384 A1 4/2013 Asakawa et al.

OTHER PUBLICATIONS

U.S. Appl. No. 13/905,273, filed May 30, 2013, Asakawa, et al.
Office Action mailed on Oct. 6, 2015 for Japanese Application No. 2012-142211 (with English translation).

* cited by examiner

LIQUID CRYSTAL DISPLAY DEVICE

CROSS-REFERENCE TO RELATED APPLICATIONS

This application is based upon and claims the benefit of priority from Japanese Patent Application No. 2012-142211, filed Jun. 25, 2012, the entire contents of which are incorporated herein by reference.

FIELD

Embodiments described herein relate generally to a liquid crystal display device.

BACKGROUND

By virtue of such advantageous features as light weight, small thickness and low power consumption, liquid crystal display devices have been used in various fields as display devices of OA equipment, such as personal computers, and TVs. In recent years, liquid crystal display devices have also been used as display devices of portable terminal equipment such as mobile phones, car navigation apparatuses, game machines, etc.

In general, a liquid crystal display panel of a fringe field switching (FFS) mode or an in-plane switching (IPS) mode is configured such that a liquid crystal layer is held between an array substrate, which includes a pixel electrode and a common electrode, and a counter-substrate. In particular, in the FFS mode, liquid crystal molecules are rotated in a plane parallel to a substrate major surface, by a fringe electric field between the pixel electrode and the common electrode. Thereby, retardation ($\Delta n \cdot d$; $\Delta n$ is a refractive index anisotropy of the liquid crystal layer, and d is a cell gap for holding the liquid crystal layer) of the liquid crystal layer is varied.

When a liquid crystal material (positive-type liquid crystal material) with a positive dielectric constant anisotropy is applied to the liquid crystal layer, liquid crystal molecules are aligned such that their major axes are positioned along a fringe electric field. Thus, when a fringe electric field extending from the pixel electrode toward the common electrode is produced, liquid crystal molecules are raised along an electric field in the vertical direction (cell thickness direction) on the pixel electrode or slits, and a sufficiently high retardation cannot be obtained. Consequently, a modulation ratio per pixel lowers, and a high transmittance cannot be obtained.

On the other hand, when a liquid crystal material (negative-type liquid crystal material) with a negative dielectric constant anisotropy is applied to the liquid crystal layer, liquid crystal molecules are aligned such that their major axes are positioned perpendicular to the fringe electric field. Thus, even in the case of a vertical electric field, liquid crystal molecules are not easily raised, and a relatively high retardation can be maintained. Compared to the case of applying the positive-type liquid crystal material, a higher transmittance can be obtained. In the case where such a negative-type liquid crystal material is applied, there has been a demand for a further improvement in transmittance.

DETAILED DESCRIPTION

Figure 1:
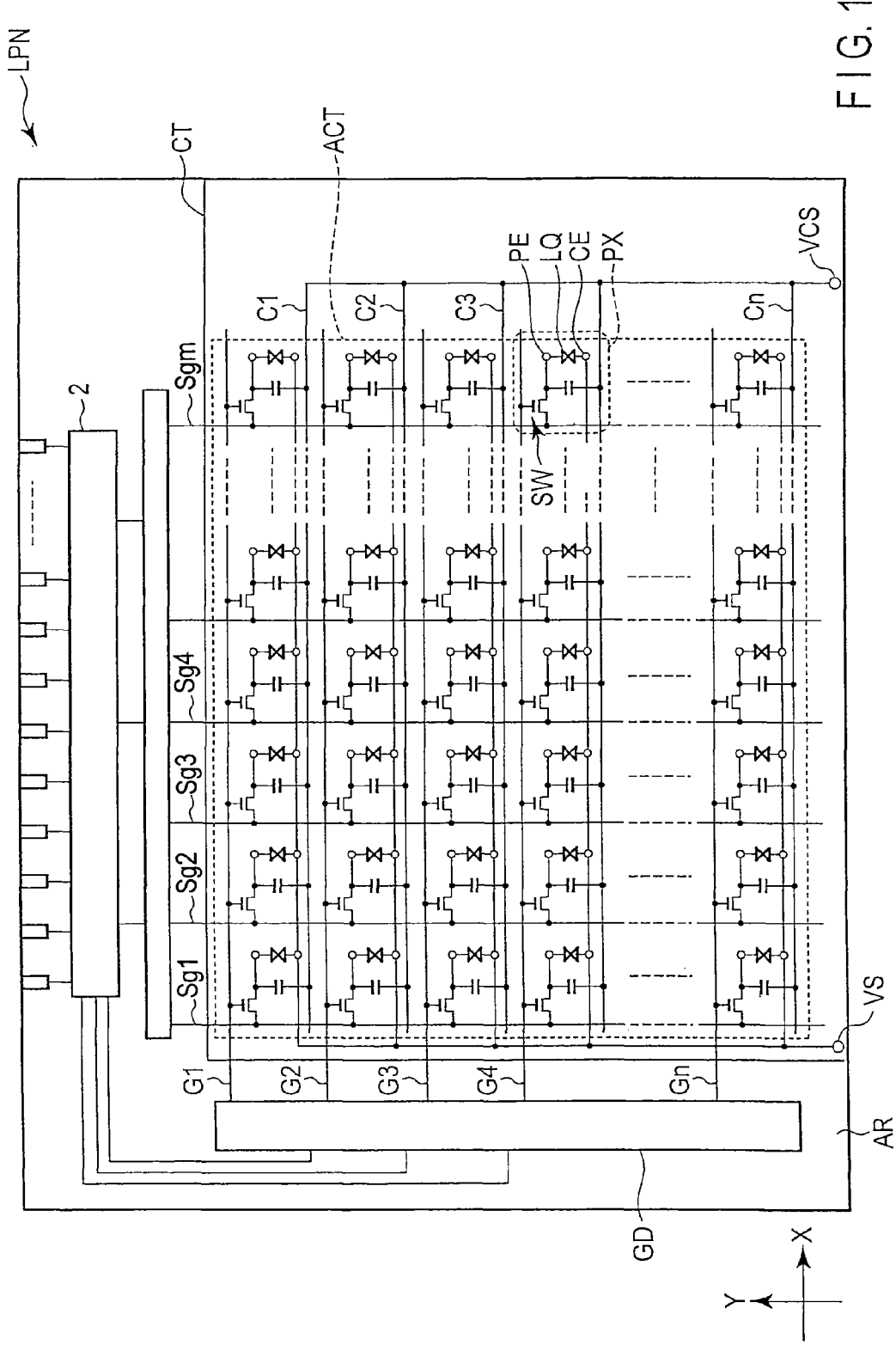
FIG. 1 is a view which schematically illustrates a structure and an equivalent circuit of a liquid crystal display panel, which constitutes a liquid crystal display device according to an embodiment.

In general, according to one embodiment, a liquid crystal display device includes: a first substrate including a gate line extending in a first direction, a source line extending in a second direction crossing the first direction, a switching element disposed in each of pixels and electrically connected to the gate line and the source line, a common electrode disposed over a plurality of pixels, an insulation film disposed on the common electrode, a pixel electrode which is electrically connected to the switching element, is disposed in each of the pixels on the insulation film, and includes an electrode portion which forms a slit opposed to the common electrode, and a first alignment film covering the pixel electrode, the slit and the electrode portion being arranged in the first direction and extending in the second direction, and L/S being in a range of between 0.5 and 0.9 when a width of the slit in the first direction is S and a width of the electrode portion in the first direction is L; a second substrate including a second alignment film which is opposed to the first alignment film; and a liquid crystal layer which is held between the first alignment film and the second alignment film, and is formed of a liquid crystal material having a negative dielectric constant anisotropy.

According to another embodiment, a liquid crystal display device includes: a first substrate including a gate line extending in a first direction, a first source line and a second source line which extend in a second direction crossing the first direction and neighbor in the first direction, a switching element electrically connected to the gate line and the first source line, a common electrode, an insulation film disposed on the common electrode, a pixel electrode which is electrically connected to the switching element, is disposed on the insulation film between the first source line and the second source line, and is opposed to the common electrode, and a first alignment film covering the pixel electrode, the pixel electrode including a first electrode portion, a first slit, a second electrode portion, a second slit and a third electrode portion which are successively arranged in the first direction, the first slit and the second slit having an equal width S, a distance between the first source line and the first electrode portion being equal to a distance between the second source line and the third electrode portion, the first electrode portion, the second electrode portion and the third electrode portion having an equal width L, and L/S being in a range of between 0.5 and 0.9; a second substrate including a second alignment film which is opposed to the first alignment film; and a liquid crystal layer which is held between the first alignment film and the second alignment film, and is formed of a liquid crystal material having a negative dielectric constant anisotropy.

According to another embodiment, a liquid crystal display device includes: a first substrate including a gate line extending in a first direction, a first source line and a second source line which extend in a second direction crossing the first direction and neighbor in the first direction, a switching element electrically connected to the gate line and the first source line, a common electrode, an insulation film disposed on the common electrode, a pixel electrode which is electrically connected to the switching element, is disposed on the insulation film between the first source line and the second source line, and is opposed to the common electrode, and a first alignment film covering the pixel electrode, the pixel electrode including a first electrode portion, a first slit, a second electrode portion, a second slit, a third electrode portion, a third slit and a fourth electrode portion which are successively arranged in the first direction, the first slit, the second slit and the third slit having an equal width S, a distance between the first source line and the first electrode portion being equal to a distance between the second source line and the fourth electrode portion, the first electrode portion, the second electrode portion, the third electrode portion and the fourth electrode portion having an equal width L, and L/S being in a range of between 0.5 and 0.9; a second substrate including a second alignment film which is opposed to the first alignment film; and a liquid crystal layer which is held between the first alignment film and the second alignment film, and is formed of a liquid crystal material having a negative dielectric constant anisotropy.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display panel LPN, which constitutes a liquid crystal display device according to an embodiment.

Specifically, the liquid crystal display device includes an active-matrix-type transmissive liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The array substrate AR includes, in the active area ACT, a plurality of gate lines G (G1 to Gn) and storage capacitance lines C (C1 to Cn) extending in a first direction X, a plurality of source lines Sg1 to Sgm extending in a second direction Y which is perpendicular to the first direction X, a switching element SW which is electrically connected to the gate line G and source line S in each pixel PX, a pixel electrode PE which is electrically connected to the switching element SW in each pixel PX, and a common electrode CE which is opposed to the pixel electrode PE. The common electrode CE is commonly formed over a plurality of pixels PX. The pixel electrode PE is formed in an island shape in each pixel PX.

Each of the gate lines G is led out of the active area ACT and is connected to a gate driver GD. Each of the source lines S is led out of the active area ACT and is connected to a source driver SD. Each of the storage capacitance lines C is led out of the active area ACT and is electrically connected to a voltage application module VCS to which a storage capacitance voltage is applied. The common electrode CE is electrically connected to a power supply module VS to which a common voltage is applied. At least parts of the gate driver GD and source driver SD are formed on, for example, the array substrate AR, and are connected to a driving IC chip 2. In the example illustrated, the driving IC chip 2, which functions as a signal source necessary for driving the liquid crystal display panel LPN, is mounted on the array substrate AR on the outside of the active area ACT of the liquid crystal display panel LPN.

In addition, the liquid crystal display panel LPN of the example illustrated is configured to be applicable to an FFS mode or an IPS mode, and includes the pixel electrode PE and common electrode CE on the array substrate AR. In the liquid crystal display panel LPN with this structure, liquid crystal molecules, which constitute the liquid crystal layer LQ, are switched by mainly using a lateral electric field which is produced between the pixel electrodes PE and the common electrode CE (e.g. that part of a fringe electric field, which is substantially parallel to the substrate major surface).

Figure 2:
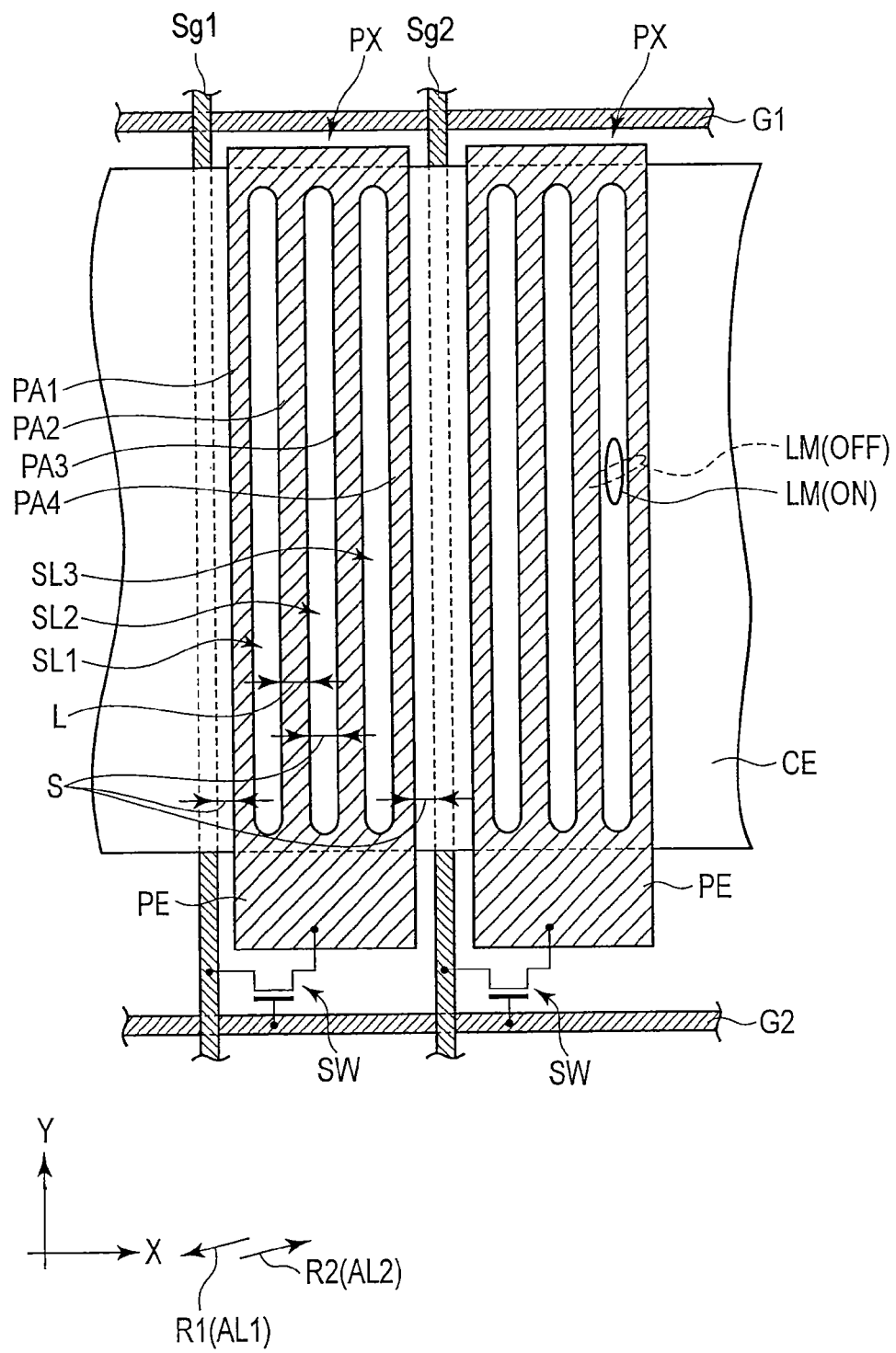
FIG. 2 is a plan view which schematically shows, from a counter-substrate side, a structure of pixels on an array substrate shown in FIG. 1.

FIG. 2 is a plan view which schematically shows, from the counter-substrate CT side, a structure of pixels PX on the array substrate AR shown in FIG. 1. FIG. 2 illustrates only a main part which is necessary for the description.

A gate line G1 and a gate line G2, which extend in the first direction X, are arranged with a first pitch in the second direction Y. A source line Sg1 and a source line Sg2, which extend in the second direction Y, are arranged with a second pitch in the first direction X, which is less than the first pitch. A pixel PX, which is defined by the gate line G1, gate line G2, source line Sg1 and source line Sg2, has, for example, a vertically elongated rectangular shape having a less length in the first direction X than in the second direction Y.

In the pixel PX on the left side in FIG. 2, a switching element SW is electrically connected to the gate line G2 and source line Sg1, and is connected to the pixel electrode PE which is located between the source line and source line Sg2. Similarly, in the pixel PX on the right side in FIG. 2, a switching element SW is electrically connected to the gate line G2 and source line Sg2.

The common electrode CE extends in the first direction X. Specifically, the common electrode CE is disposed in each pixel and extends above each source line Sg, and the common electrode CE is commonly formed over plural pixels PX which neighbor in the first direction X.

The pixel electrode PE of each pixel PX is disposed above the common electrode CE. Each pixel electrode PE is formed in an island shape corresponding to the rectangular pixel shape. In the example illustrated, the pixel electrode PE is formed in a substantially rectangular shape having short sides along the first direction X and long sides along the second direction Y. A plurality of slits SL, which are opposed to the common electrode CE, are formed in each pixel electrode PE. In other words, each pixel electrode PE includes a plurality of electrode portions PA which form the slits SL. In the example illustrated, the pixel electrode PE includes four electrode portions PA1 to PA4 which are arranged in the first direction X and extend in the second direction Y, and includes three slits SL1 to SL3 which are arranged in the first direction X and extend in the second direction Y. Specifically, each of the slits SL1 to SL3 has a major axis which is parallel to the second direction Y. The shape of the pixel electrode PE will be described later in greater detail.

Paying attention to the pixel electrode PE which is located between the source line Sg1 and source line Sg2, the pixel electrode PE includes the electrode portion PA1, slit SL1, electrode portion PA2, slit SL2, electrode portion PA3, slit SL3 and electrode portion PA4, from the source line Sg1 side toward the source line Sg2. The slits SL1 to SL3 are arranged in the named order in the first direction X. The slits SL1 to SL3 have substantially the same width S in the first direction X. The electrode portions PA1 to PA4 are arranged in the named order in the first direction X. The slit SL1 is formed between the electrode portion PA1 and electrode portion PA2. The slit SL2 is formed between the electrode portion PA2 and electrode portion PA3. The slit SL3 is formed between the electrode portion PA3 and electrode portion PA4. The electrode portions PA1 to PA4 have substantially the same electrode width L in the first direction X. Each of the distance in the first direction X between the source line Sg1 and electrode portion PA1 and the distance in the first direction X between the source line Sg2 and electrode portion PA4 is substantially equal to the slit width S.

In the meantime, the shape of the pixel electrode PE is not limited to the example illustrated.

Figure 3:
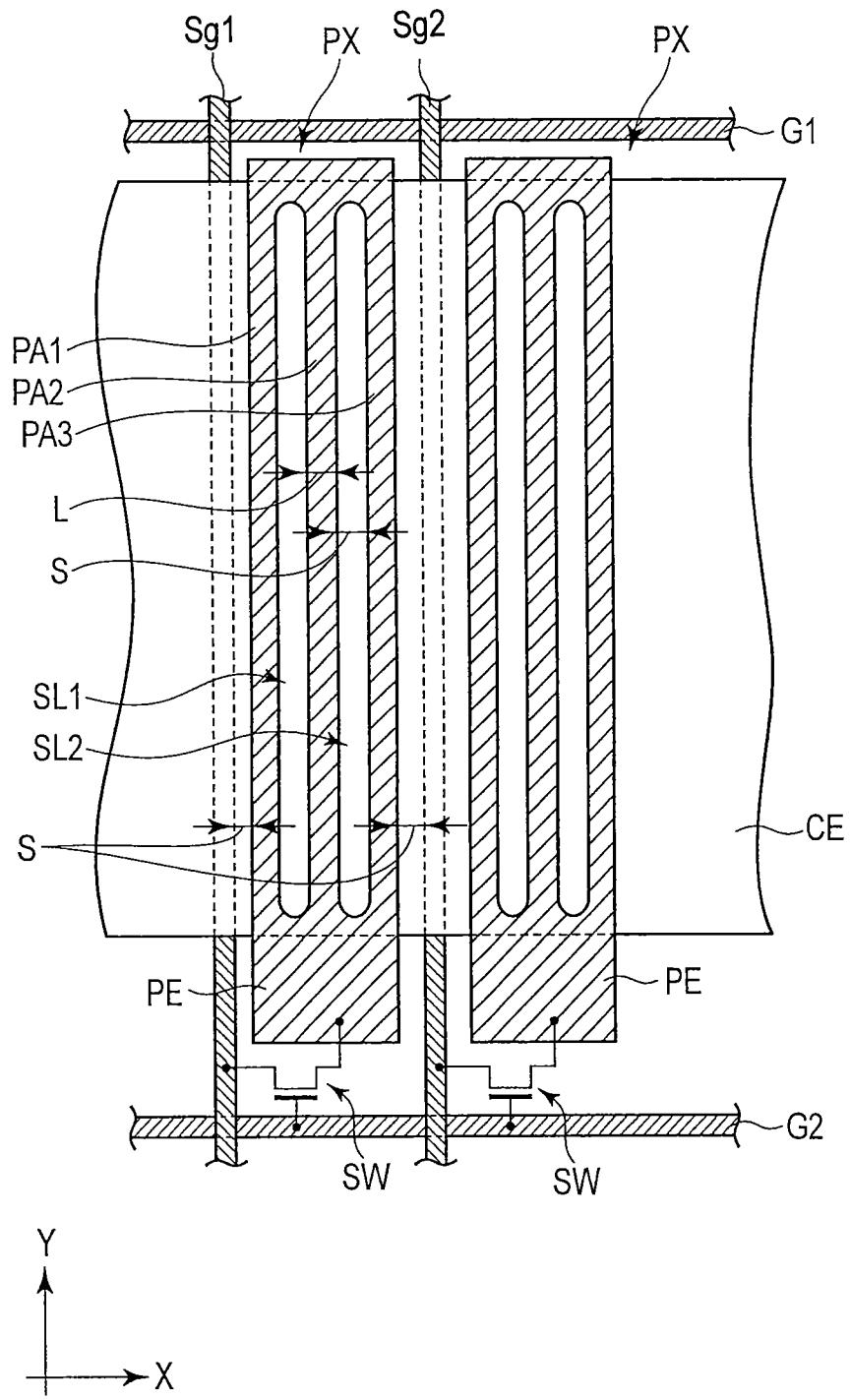
FIG. 3 is a plan view which schematically shows, from the counter-substrate side, another structure of pixels on the array substrate shown in FIG. 1.

FIG. 3 is a plan view which schematically shows, from the counter-substrate CT side, another structure of pixels PX on the array substrate AR shown in FIG. 1.

The example shown in FIG. 3 differs from the example shown in FIG. 2 in that the pixel electrode PE includes three electrode portions PA1 to PA3 and two slits SL1 and SL2.

Specifically, paying attention to the pixel electrode PE which is located between the source line Sg1 and source line Sg2, the pixel electrode PE includes the electrode portion PA1, slit SL1, electrode portion PA2, slit SL2, and electrode portion PA3, from the source line Sg1 side toward the source line Sg2. Each of the electrode portions PA1 to PA3 and each of the slits SL1 and SL2 extends in the second direction. The electrode portions PA1 to PA3 have substantially the same electrode width L in the first direction X. The slit SL1 is formed between the electrode portion PA1 and electrode portion PA2. The slit SL2 is formed between the electrode portion PA2 and electrode portion PA3. The slits SL1 and SL2 have substantially the same width S in the first direction X. Each of the distance in the first direction X between the source line Sg1 and electrode portion PA1 and the distance in the first direction X between the source line Sg2 and electrode portion PA3 is substantially equal to the slit width S. As regards the other structural aspects, the example of FIG. 3 is the same as the example of FIG. 2, and a description is omitted here.

Figure 4:
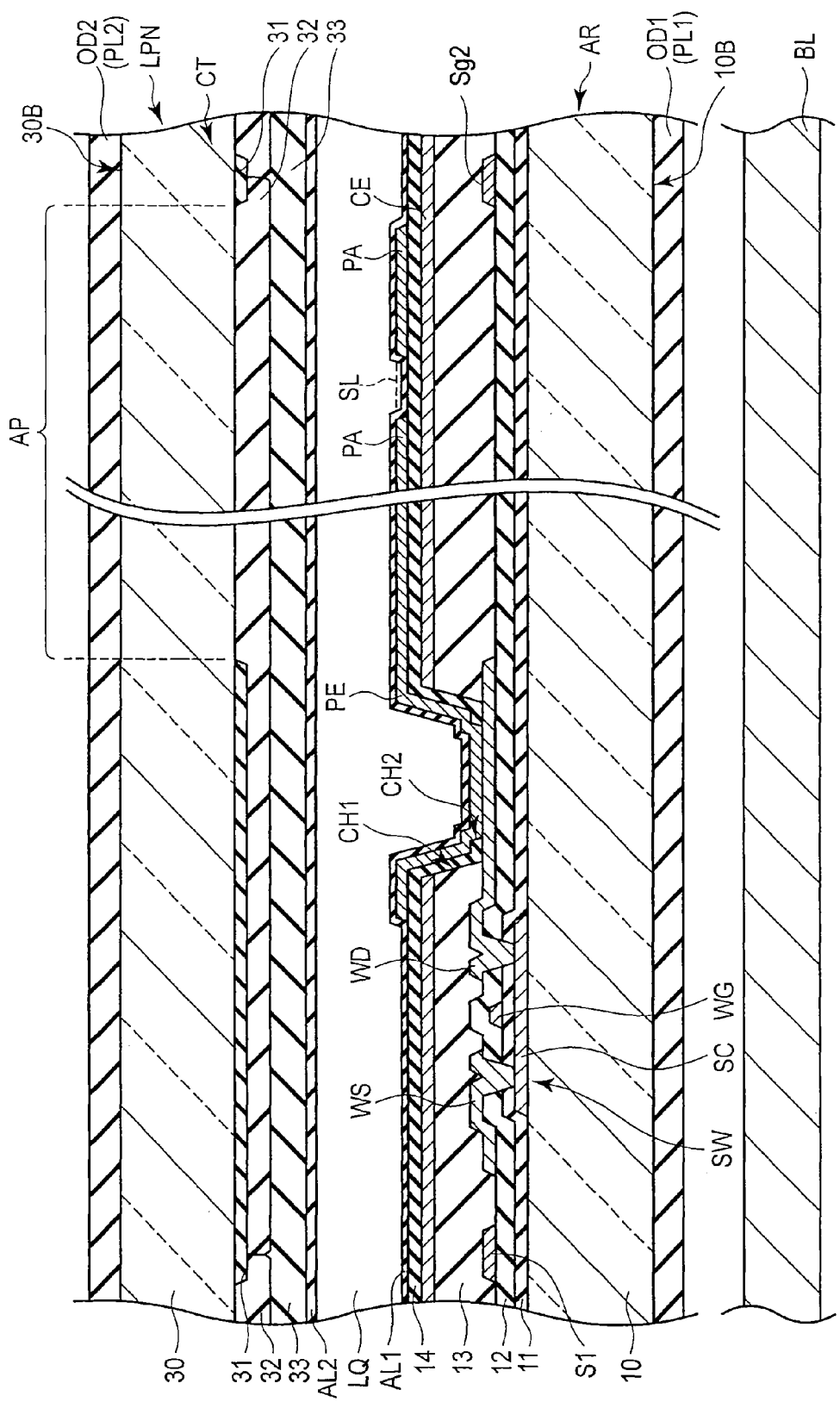
FIG. 4 is a view which schematically illustrates a cross-sectional structure including a switching element and a slit of a pixel electrode in one pixel of the liquid crystal display panel shown in FIG. 1.

FIG. 4 is a view which schematically illustrates a cross-sectional structure including the switching element SW and one slit SL of the pixel electrode PE in one pixel of the liquid crystal display panel LPN shown in FIG. 1.

Specifically, the array substrate AR is formed by using a first insulative substrate 10 with light transmissivity, such as a glass substrate. The array substrate AR includes, on that side of the first insulative substrate 10 which is opposed to the counter-substrate CT, a switching element SW, a common electrode CE, a pixel electrode PE, a first insulation film 11, a second insulation film 12, a third insulation film 13, a fourth insulation film 14, and a first alignment film AL1.

The switching element SW illustrated in FIG. 4 is, for example, a top-gate-type thin-film transistor (TFT). Incidentally, the switching element SW may be of a bottom-gate type. The switching element SW includes a semiconductor layer SC which is formed of, e.g. polysilicon. The semiconductor layer SC is disposed on the first insulative substrate 10. In the meantime, an undercoat layer, which is an insulation film, may be interposed between the first insulative substrate 10 and the semiconductor layer SC. The semiconductor layer SC is covered with the first insulation film 11. In addition, the first insulation film 11 is also disposed on the first insulative substrate 10.

A gate electrode WG of the switching element SW is formed on the first insulation film 11, and is located immediately above the semiconductor layer SC. The gate electrode WG is electrically connected to a gate line (not shown), and is covered with the second insulation film 12. In addition, the second insulation film 12 is also disposed on the first insulation film 11.

A source electrode WS and a drain electrode WD of the switching element SW are formed on the second insulation film 12. Similarly, the source line Sg1 and source line Sg2 are formed on the second insulation film 12. The source electrode WS, which is illustrated, is electrically connected to the source line Sg1. The source electrode WS and drain electrode WD are put in contact with the semiconductor layer SC, respectively, through contact holes penetrating the first insulation film 11 and second insulation film 12. The switching element SW with this structure, as well as the source line Sg1 and source line Sg2, is covered with the third insulation film 13. The third insulation film 13 is also disposed on the second insulation film 12. A contact hole CH1, which penetrates to the drain electrode WD, is formed in the third insulation film 13. The third insulation film 13 is formed of, for example, a transparent resin material.

The common electrode CE is formed on the third insulation film 13. Incidentally, the common electrode CE does not extend to the first contact hole CH1 which is formed in the third insulation film 13. The common electrode CE is formed of a transparent, electrically conductive material such as indium tin oxide (ITO) or indium zinc oxide (IZO). The fourth insulation film 14 is disposed on the common electrode CE. Although not illustrated, the fourth insulation film 14 is also disposed on the third insulation film 13. A second contact hole CH2, which penetrates to the drain electrode WD, is formed in that part of the fourth insulation film 14, which covers the first contact hole CH1. The fourth insulation film 14 functions as an interlayer insulation film which is interposed between the common electrode CE and the pixel electrode PE which will be described below. The fourth insulation film 14 is formed of, e.g. silicon nitride (SiNx), so as to have a less film thickness than the third insulation film 13.

The pixel electrode PE is formed on the fourth insulation film 14 and is opposed to the common electrode CE. To be more specific, the pixel electrode PE is electrically connected to the drain electrode WD of the switching element SW through the first contact hole CH1 which penetrates the third insulation film 13, and the second contact hole CH1 which penetrates the fourth insulation film 14. The pixel electrode PE is formed of a transparent, electrically conductive material such as ITO or IZO.

The pixel electrode PE is covered with a first alignment film AL1. Specifically, the first alignment film AL1 covers the electrode portions PA, extends over the slits SL, and covers the fourth insulation film 14. The first alignment film AL1 is formed of a material which exhibits horizontal alignment properties.

On the other hand, the counter-substrate CT is formed by using a second insulative substrate 30 with light transmissivity, such as a glass substrate. The counter-substrate CT includes, on that side of the second insulative substrate 30 which is opposed to the array substrate AR, a black matrix 31, color filters 32, an overcoat layer 33, and a second alignment film AL2.

The black matrix 31 partitions the pixels PX and forms an aperture portion AP. The black matrix 31 is opposed to wiring portions, such as gate lines G, source lines Sg and switching elements SW, which are provided on the array substrate AR. The color filter 32 is formed in the aperture portion AP and also extends over the black matrix 31. The color filters 32 are formed of resin materials which are colored in mutually different colors, e.g. three primary colors of red, blue and green. Boundaries between the color filters 32 of different colors are located at positions overlapping the black matrix 31 above the source line Sg1 and source line Sg2.

The overcoat layer 33 covers the color filters 32. The overcoat layer 33 planarizes asperities on the surface of the black matrix 31 and color filters 32. Specifically, that surface of the overcoat layer 33, which is opposed to the array substrate AR, is substantially planar. The overcoat layer 33 is formed of a transparent resin material.

The overcoat layer 33 is covered with the second alignment film AL2. The second alignment film AL2 is formed of a material which exhibits horizontal alignment properties.

The above-described array substrate AR and counter-substrate CT are disposed such that their first alignment film AL1 and second alignment film AL2 are opposed to each other. In this case, a columnar spacer, which is formed on one of the array substrate AR and counter-substrate CT, creates a predetermined cell gap between the array substrate AR and the counter-substrate CT. The array substrate AR and counter-substrate CT are attached by a sealant in the state in which the cell gap is created therebetween. The liquid crystal layer LQ is composed of a liquid crystal composition including liquid crystal molecules LM which are sealed in the cell gap created between the first alignment film AL1 of the array substrate AR and the second alignment film AL2 of the counter-substrate CT. The liquid crystal layer LQ is formed of, for example, a liquid crystal material with a negative (negative-type) dielectric constant anisotropy.

A backlight BL is disposed on the back side of the liquid crystal display panel LPN having the above-described structure. Various modes are applicable to the backlight BL. As the backlight BL, use may be made of either a backlight which utilizes a light-emitting diode (LED) as a light source, or a backlight which utilizes a cold cathode fluorescent lamp (CCFL) as a light source. A description of the detailed structure of the backlight BL is omitted.

A first optical element OD1 including a first polarizer PL1 is disposed on an outer surface of the array substrate AR, that is, an outer surface 10B of the first insulative substrate 10. In addition, a second optical element OD2 including a second polarizer PL2 is disposed on an outer surface of the counter-substrate CT, that is, an outer surface 30B of the second insulative substrate 30. A first polarization axis of the first polarizer PL1 and a second polarization axis of the second polarizer PL2 are disposed, for example, in a positional relationship of crossed Nicols.

The first alignment film AL1 and second alignment film AL2 are subjected to alignment treatment (e.g. rubbing treatment or optical alignment treatment) in mutually parallel directions in a plane parallel to substrate major surfaces (or an X-Y plane), as illustrated in FIG. 2. The first alignment film AL1 is subjected to alignment treatment in a direction crossing the first direction X, in which the slits SL are arranged, at an acute angle of 45° or less. An alignment treatment direction R1 of the first alignment film AL1 is, for example, a direction which crosses the first direction X at an angle of 5° to 15°. In addition, the second alignment film AL2 is subjected to alignment treatment in a direction which is parallel to the alignment treatment direction R1 of the first alignment film AL1. The alignment treatment direction R1 of the first alignment film AL1 and an alignment treatment direction R2 of the second alignment film AL2 are opposite to each other.

In the meantime, the first polarization axis of the first polarizer PL1 is set to be, for example, substantially parallel to the alignment treatment direction R1 of the first alignment film AL1, and the second polarization axis of the second polarizer PL2 is set to be perpendicular to the alignment treatment direction R1 of the first alignment film AL1.

Next, the operation of the liquid crystal display device with the above-described structure is described.

At an OFF time when such a voltage as to produce a potential difference is not applied between the pixel electrode PE and common electrode CE, no voltage is applied to the liquid crystal layer LQ, and no electric field is produced between the pixel electrode PE and common electrode CE. Thus, liquid crystal molecules LM included in the liquid crystal layer LQ are initially aligned, as indicated by a solid line in FIG. 2, in the alignment treatment directions of the first alignment film AL1 and second alignment film AL2 in the X-Y plane (the direction in which the liquid crystal molecules LM are initially aligned is referred to as "initial alignment direction").

At the OFF time, part of light from the backlight BL passes through the first polarizer PL1 and enters the liquid crystal display panel LPN. The light, which enters the liquid crystal display panel LPN, is linearly polarized light which is perpendicular to the first polarization axis of the first polarizer PL1. The polarization state of such linearly polarized light hardly varies when the light passes through the liquid crystal display panel LPN at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, at an ON time when such a voltage as to produce a potential difference is applied between the pixel electrode PE and common electrode CE, a voltage is applied to the liquid crystal layer LQ, and a fringe electric field is produced between the pixel electrode PE and common electrode CE. Thus, the liquid crystal molecules LM are aligned in a direction different from the initial alignment direction in the X-Y plane, as indicated by a broken line in FIG. 2. In the case of a negative-type liquid crystal material, the liquid crystal molecules LM are aligned such that their major axes are substantially perpendicular to the electric field.

At the ON time, linearly polarized light, which is perpendicular to the first polarization axis of the first polarizer PL1, enters the liquid crystal display panel LPN, and the polarization state of such linearly polarized light varies depending on the alignment state of the liquid crystal molecules LM (or the retardation of the liquid crystal layer) when the light passes through the liquid crystal layer LQ. Thus, at the ON time, at least part of the light emerging from the liquid crystal layer LQ passes through the second polarizer PL2 (white display).

As has been described above, according to the present embodiment in which the negative-type liquid crystal material is applied, in a region where a horizontal electric field, which is included in the fringe electric field produced at the ON time and is parallel to the X-Y plane, or a vertical electric field, which is included in the fringe electric field produced at the ON time and is perpendicular to the X-Y plane, is produced, the liquid crystal molecules LM rotate substantially horizontally in the X-Y plane such that their major axes cross the electric field at right angles, and a desired retardation can be obtained. On the other hand, in a comparative example in which a positive-type liquid crystal material is applied, in a region where a vertical electric field, which is included in the fringe electric field and crosses the X-Y plane, is produced, the liquid crystal molecules LM are aligned such that their major axes are raised relative to the X-Y plane, and it is difficult to obtain a desired retardation. Thus, according to the present embodiment, compared to the comparative example, the modulation ratio and transmittance can be improved.

Next, transmittance distributions in structure examples in which a negative-type liquid crystal material is applied will be examined.

Figure 5:
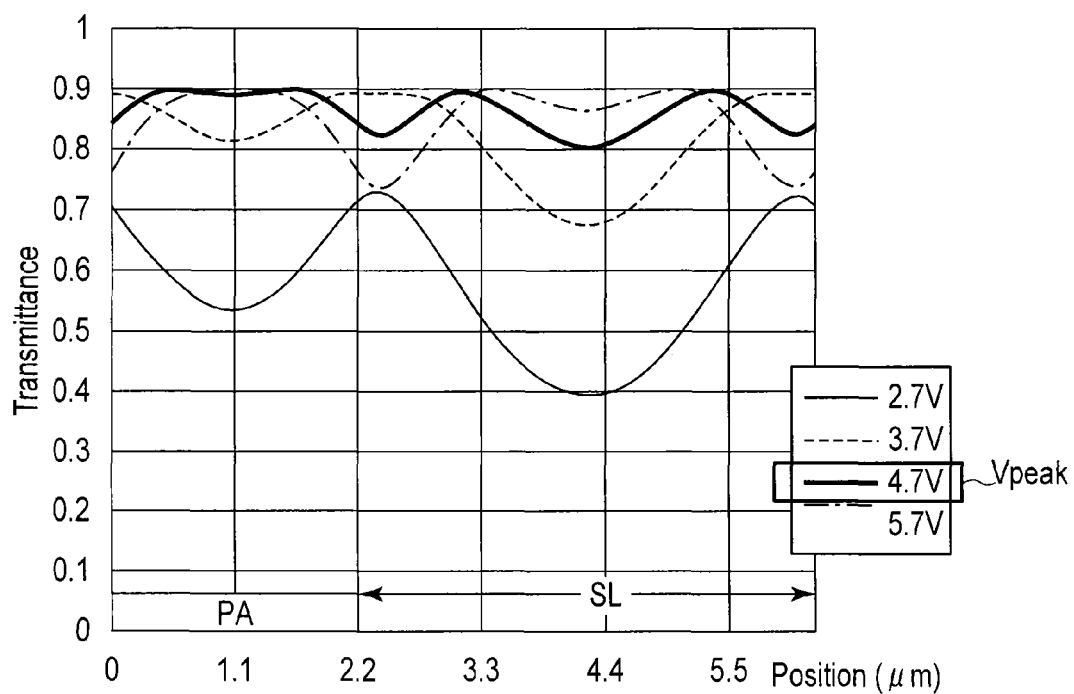
FIG. 5 is a graph showing a simulation result of a transmittance distribution on a pixel electrode in a structure example in which a negative-type liquid crystal material is applied.

FIG. 5 is a graph showing a simulation result of a transmittance distribution on a pixel electrode in a structure example in which a negative-type liquid crystal material is applied.

The abscissa in FIG. 5 indicates a position (μm) in the first direction X on one pixel electrode PE, and the ordinate indicates a transmittance. The example illustrated in FIG. 5 indicates in-plane distributions of transmittances when the voltage, which is applied to the liquid crystal layer, was set at 2.7 V, 3.7 V, 4.7 V (a peak voltage at which a peak transmittance is obtained; Vpeak), and 5.7 V.

The conditions for the simulation were set such that the width S of the slit SL is 4.05 μm and the width L of the electrode portion PA is 2.2 μm. In short, the value of L/S is about 0.54. In addition, as a liquid crystal material, use was made of a negative-type liquid crystal material having a refractive index anisotropy Δn of 0.1 at a green wavelength (546 nm), and the cell gap was set at 3.3 μm.

As shown in FIG. 5, such a tendency was confirmed that the transmittance increases in accordance with an increase of applied voltage on the electrode portion PA. On the other hand, at a position corresponding to the slit SL, the transmittance does not necessarily increase in accordance with an increase of applied voltage. For example, in the vicinity of a boundary between the electrode portion PA and slit SL, a higher transmittance is obtained in the case where the applied voltage is set at 3.7 V which is lower than the peak voltage. In addition, in the vicinity of the middle of the slit SL, a higher transmittance is obtained in the case where the applied voltage is set at 5.7 V which is higher than the peak voltage. In this manner, on the slit SL, the applied voltage for obtaining the highest transmittance varies from position to position. This is partly because the distribution of the fringe electric field, which is produced between the pixel electrode PE and common electrode CE via the slit SL, varies depending on the width S of the slit SL.

Figure 6:
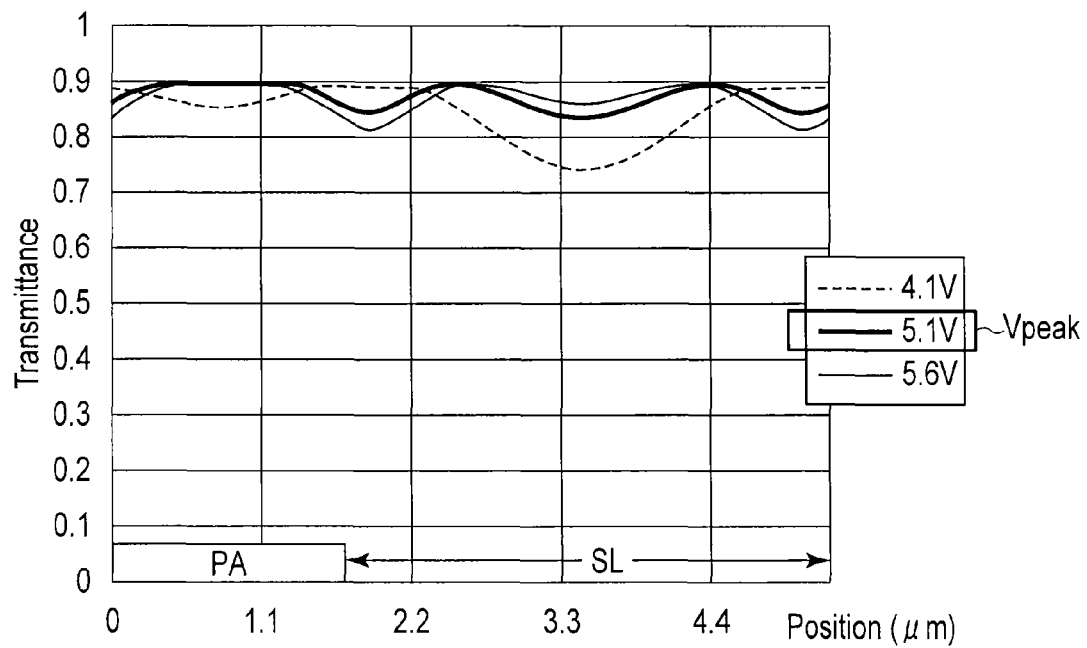
FIG. 6 is a graph showing a simulation result of a transmittance distribution on a pixel electrode in another structure example in which a negative-type liquid crystal material is applied.

FIG. 6 is a graph showing a simulation result of a transmittance distribution on a pixel electrode in another structure example in which a negative-type liquid crystal material is applied. The example illustrated in FIG. 6 indicates in-plane distributions of transmittances when the voltage, which is applied to the liquid crystal layer, was set at 4.1 V, 5.1 V (a peak voltage at which a peak transmittance is obtained; Vpeak), and 5.6 V. The conditions for this simulation were set to be the same as those described with reference to FIG. 5, except that the width S of the slit SL is set at 3.55 μm and the width L of the electrode portion PA is set at 2.7 μm (i.e. the value of L/S is about 0.76). As illustrated in FIG. 6, compared to the example shown in FIG. 5, it was confirmed that the difference in transmittance at the position on the pixel electrode decreases when the peak voltage is applied. In particular, it was confirmed that a high transmittance is obtained when the peak voltage is applied, not only on the electrode portion PA, but also in substantially the entire region on the slit SL.

Based on these simulation results, the inventor estimated that a high transmittance can be obtained when the peak voltage is applied, regardless of the position on the slit SL, by optimizing the width S of the slit SL, and as a result, the transmittance per pixel can be improved. Then, the inventor further simulated the difference in transmittance relative to the value of L/S.

Figure 7:
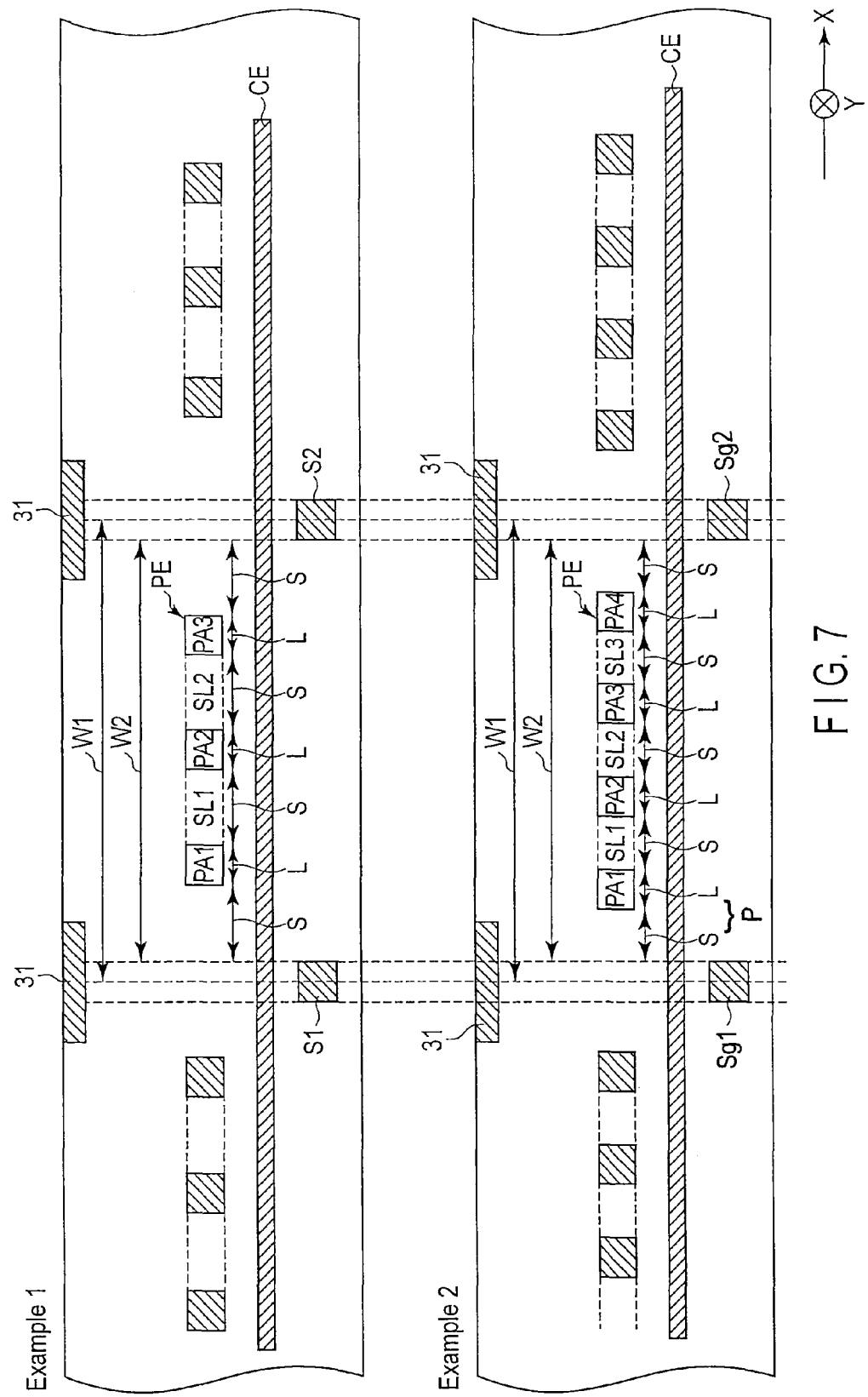
FIG. 7 is a cross-sectional view which schematically shows structure examples of Example 1 and Example 2.

FIG. 7 is a cross-sectional view which schematically shows structure examples of Example 1 and Example 2.

Example 1 corresponds to the example described with reference to FIG. 3. The pixel electrode PE includes three electrode portions PA1 to PA3. The electrode portions PA1 to PA3 have the same width L, and slits SL1 and SL2 have the same width S. In addition, the distance in the first direction X from each source line Sg to the pixel electrode PE, namely, each of the distance in the first direction X from the edge of the source line Sg1 to the electrode portion PA1 and the distance in the first direction X from the edge of the source line Sg2 to the electrode portion PA3, is equal to the width S of the slit.

For example, a description is given of the case in which a distance W1 in the first direction X, which corresponds to the pitch of neighboring source lines Sg1 and Sg2, is 26 μm, and an aperture width (i.e. a distance between mutually opposed edges of neighboring source lines) W2 in the first direction between the neighboring source lines Sg1 and Sg2 is 22.8 μm. The value of S is 4.05 μm, the value of L is 2.2 μm, and the value of L/S is 0.54. The value of W2 is equal to the sum of the width of the pixel electrode PE (=3×L+ 2×S) and the distances from the source lines Sg to the pixel electrode PE (=2×S). Incidentally, the width of the black matrix 31 in the first direction X is, for example, 5.5 μm, and the width of each source line Sg in the first direction X is 3.2 μm. In Example 1, the pitch P corresponding to the sum of the value of Sg and the value of L was fixed at 6.25 μm, and the peak transmittance at a time when the value of L/S was varied was calculated by simulation.

Example 2 corresponds to the example described with reference to FIG. 2. The pixel electrode PE includes four electrode portions PA1 to PA4. The electrode portions PA1 to PA4 have the same width L, and slits SL1 to SL3 have the same width S. In addition, each of the distance in the first direction X from the edge of the source line Sg1 to the electrode portion PA1 and the distance in the first direction X from the edge of the source line Sg2 to the electrode portion PA4 is equal to the width S of the slit. For example, the distance W1 is 26 μm, the aperture width W2 is 22.8 μm, the value of S is 2.8 μm, the value of L is 2.2 μm, and the value of L/S is 0.79. In Example 2, the pitch P corresponding to the sum of the value of S and the value of L was fixed at 5.0 µm, and the peak transmittance at a time when the value of L/S was varied was calculated by simulation.

Figure 8:
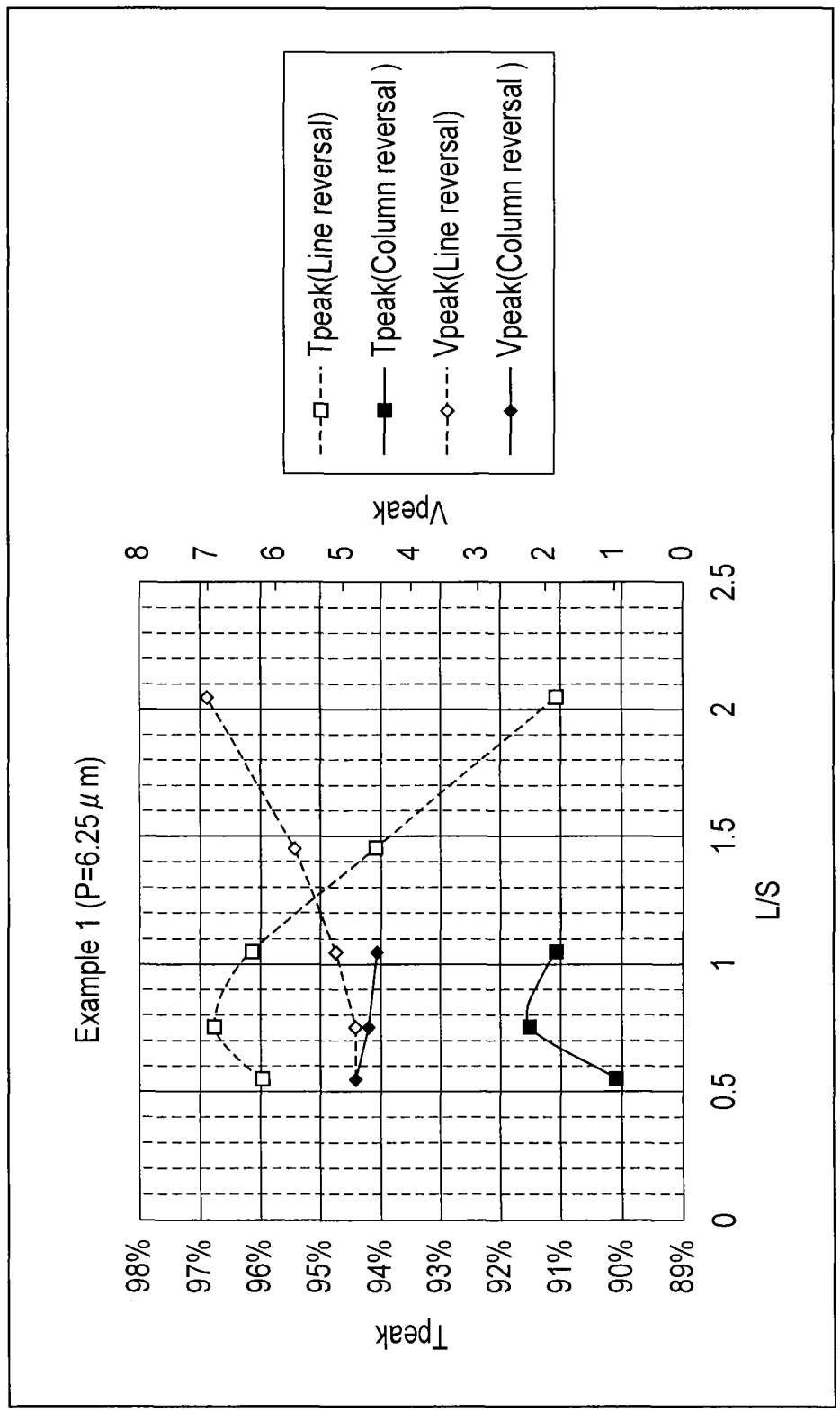
FIG. 8 is a graph showing a simulation result of calculating a peak transmittance in Example 1.

FIG. 8 is a graph showing a simulation result of calculating a peak transmittance in Example 1. In FIG. 8, a peak voltage, at which a peak transmittance is obtained, is also indicated.

When a driving method (e.g. line reversal driving method), in which, pixel potentials of pixels neighboring in the first direction X are potentials of the same polarity, is applied, a fringe electric field, which is produced in each pixel, acts on the liquid crystal layer LQ which is located above the pixel electrode PE of each pixel PX and between the pixel electrode PE and source line S. Thus, a high transmittance can be obtained not only above the pixel electrode PE, but also in the region between the pixel electrode PE and source line S. As illustrated in FIG. 8, according to the simulation result, it was confirmed that a high peak transmittance Tpeak is obtained in a range of the value of L/S between 0.7 and 0.9, and in particular, the peak transmittance Tpeak takes a maximum value in a range of the value of L/S between 0.7 and 0.8.

When a driving method (e.g. column reversal driving method), in which pixel potentials of pixels neighboring in the first direction X are potentials of opposite polarities, is applied, a fringe electric field, which is produced in each pixel, acts on the liquid crystal layer LQ which is located above the pixel electrode PE of each pixel PX. In the meantime, in addition to the fringe electric field, a horizontal electric field, which is produced between neighboring pixel electrodes, acts on the liquid crystal layer LQ which is located between the pixel electrode PE and source line S. Thus, although a high transmittance is obtained above the pixel electrode PE, the region between the pixel electrode PE and source line S tends to be affected by the horizontal electric field. However, in Example 1, since the number of electrode portions PA, which are included in the pixel electrode PE, is as small as three, and the distance from the pixel electrode PE to the source line s is relatively large, the influence of the horizontal electric field is small. Thus, the distribution of the peak transmittance Tpeak exhibits the same tendency as in the line reversal driving method. According to the simulation result illustrated, it was confirmed that a high peak transmittance Tpeak is obtained in a range of the value of L/S between 0.7 and 0.9, and in particular, the peak transmittance Tpeak takes a maximum value in a range of the value of L/S between 0.7 and 0.8.

Figure 9:
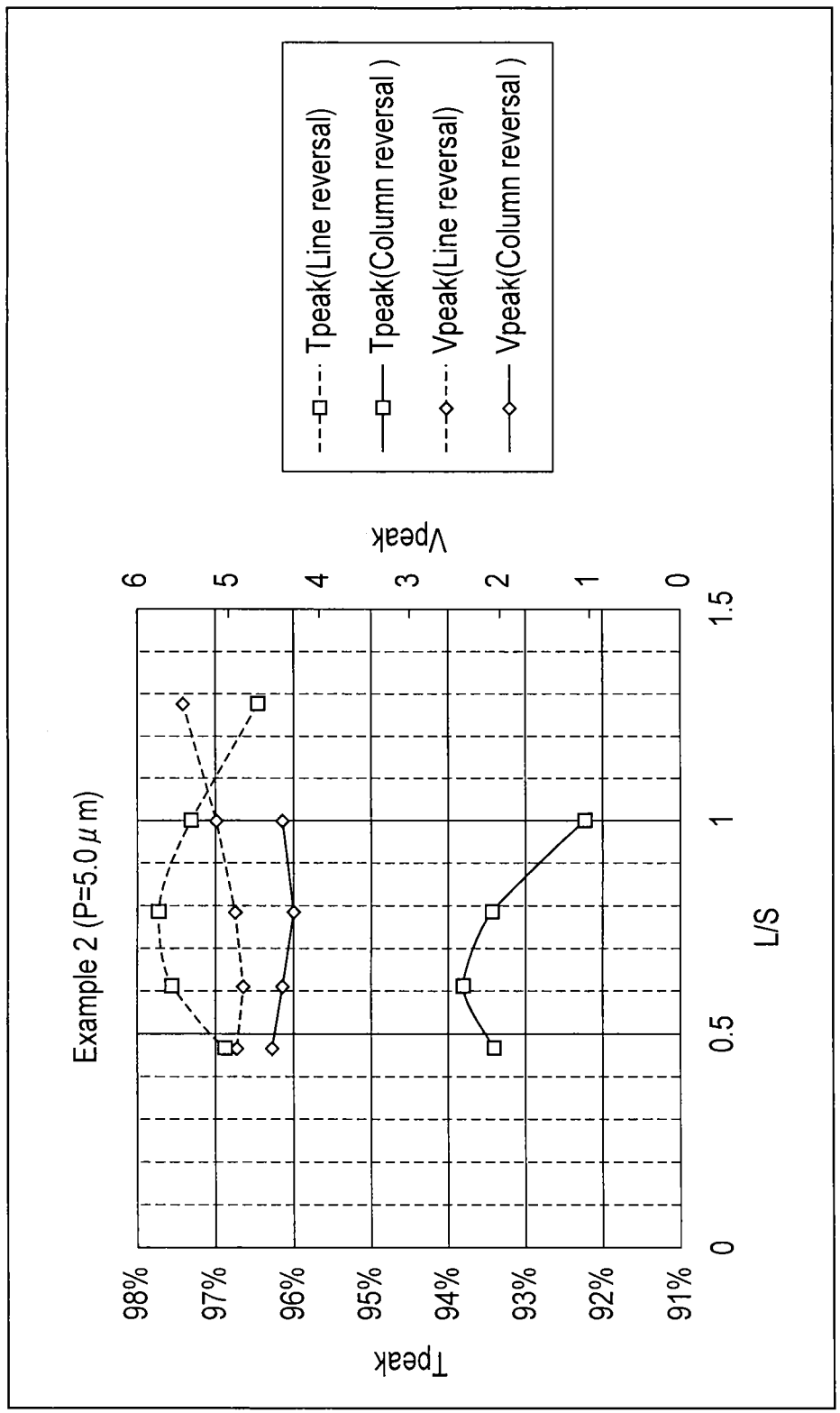
FIG. 9 is a graph showing a simulation result of calculating a peak transmittance in Example 2.

FIG. 9 is a graph showing a simulation result of calculating a peak transmittance in Example 2. In FIG. 9, a peak voltage, at which a peak transmittance is obtained, is also indicated.

When a driving method (e.g. line reversal driving method), in which pixel potentials of pixels neighboring in the first direction X are potentials of the same polarity, is applied, it was confirmed, according to the simulation result illustrated, that a high peak transmittance Tpeak is obtained in a range of the value of L/S between 0.6 and 0.9, and in particular, the peak transmittance Tpeak takes a maximum value in a range of the value of L/S between 0.7 and 0.8.

When a driving method (e.g. column reversal driving method), in which pixel potentials of pixels neighboring in the first direction X are potentials of opposite polarities, is applied, as described above, a horizontal electric field which is produced between neighboring pixel electrodes, in addition to the fringe electric field, acts on the liquid crystal layer LQ which is located between the pixel electrode PE and source line S. In Example 2, compared to Example 1, since the distance from the pixel electrode PE to the source line S is relatively small, the region between the pixel electrode PE and source line S tends to be affected by the horizontal electric field. Thus, the distribution of the peak transmittance Tpeak exhibits a tendency which is slightly different from the tendency in the line reversal driving method. According to the simulation result illustrated, it was confirmed that a high peak transmittance Tpeak is obtained in a range of the value of L/S between 0.5 and 0.8, and in particular, the peak transmittance Tpeak takes a maximum value in a range of the value of L/S between 0.6 and 0.7.

According to the above-described simulations in Example 1 and Example 2, it was confirmed that a high peak transmittance Tpeak can be obtained by setting the value of L/S in the range of between 0.5 and 0.9, regardless of the driving method.

As has been described above, according to the present embodiment, a liquid crystal display device, which can improve display quality, can be provided.

Figure 10:
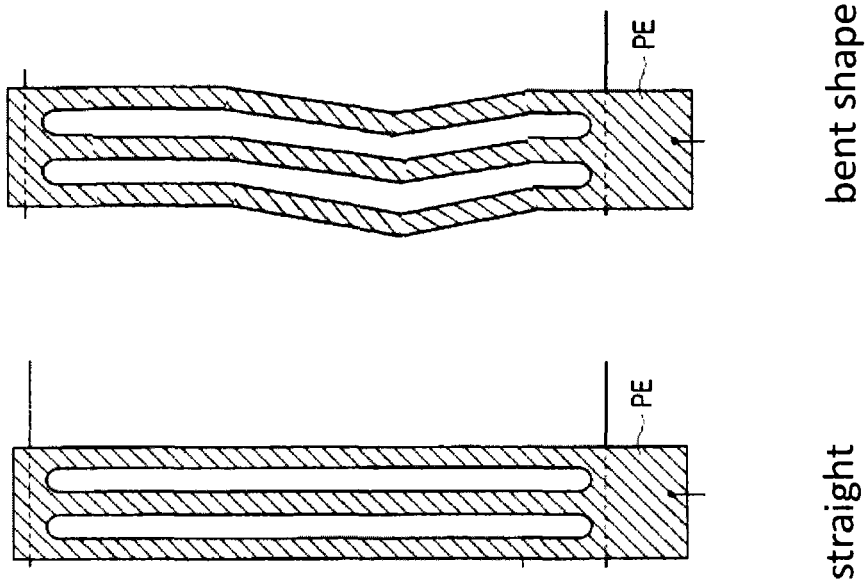
FIG. 10 is a depiction of a bent shape pixel electrode.

In the above-described embodiment, the slits SL of the pixel electrode PE are formed such that the slits SL have major axes which are parallel to the second direction Y. Alternatively, the slits SL of the pixel electrode PE may be formed such that their major axes are parallel to the first direction X or parallel to a direction crossing the first direction X and second direction Y, or the slits SL of the pixel electrode PE may be formed in a bent shape like an angle bracket (<) shape, as shown in FIG. 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a gate line extending in a first direction, a source line extending in a second direction crossing the first direction, a switching element disposed in each of pixels and electrically connected to the source line, a common electrode disposed over a plurality of pixels, an insulation film disposed on the common electrode, a pixel electrode which is electrically connected to the switching element, is disposed in each of the pixels on the insulation film, and includes electrode portions which form a slit opposed to the common electrode, and a first alignment film covering the pixel electrode;
a second substrate including a second alignment film which is opposed to the first alignment film; and
a liquid crystal layer which is held between the first alignment film and the second ent film, and is formed of a liquid crystal material having a negative dielectric constant anisotropy;
a driving circuit configured to execute driving of the plurality of pixels by column reversal in which potentials of pixels neighboring in the first direction are potentials of opposite polarities, and potentials of pixels neighboring in the second direction are potentials of the same polarity,
wherein
the common electrode is located between the source line and the liquid crystal layer, and is opposed to the source line,
the pixel electrode and the common electrode form a fringe electric field,
the electrode portions are arranged in the first direction,
the electrode portions and the slit extend in the second direction, and L/S is in a range of between 0.5 and 0.9 when a width of the slit in the first direction is S and a width of the electrode portion in the first direction is L.

2. The liquid crystal display device of claim 1, wherein the pixel electrode includes three electrode portions or four electrode portions, and the L/S is in a range of between 0.7 and 0.8.

3. The liquid crystal display device of claim 1, wherein the pixel electrode includes three electrode portions or four electrode portions, and the L/S is in a range of between 0.5 and 0.6.

4. The liquid crystal display device of claim 1, wherein a distance in the first direction from the source line to the pixel electrode is substantially equal to the width S.

5. The liquid crystal display device of claim 1, wherein a first alignment treatment direction of the first alignment film is a direction crossing the first direction at an acute angle of 45° or less, and a second alignment treatment direction of the second alignment film is parallel to, and opposite to, the first alignment treatment direction.

6. The liquid crystal display device of claim 1, wherein the slit has a bent shape along the second direction of the source line.

7. The liquid crystal display device of claim 1, wherein the pixel electrode includes a plurality of slits arranged in the first direction.

8. The liquid crystal display device of claim 7, wherein the number of electrode portions is three in each of the pixels and the number of slits is two in each of the pixels.

9. The liquid crystal display device of claim 8, wherein the L/S is in a range of between 0.7 and 0.9.

10. The liquid crystal display device of claim 7, wherein the number of electrode portions is four in each of the pixels and the number of slits is three in each of the pixels.

11. The liquid crystal display device of claim 10, wherein the L/S is in a range of between 0.5 and 0.8.

12. The liquid crystal display device of claim 1, wherein pixels neighboring in the first direction are connected to the same gate line.

* * * * *